US005537091A

United States Patent [19]
Hull et al.

[11] Patent Number: 5,537,091
[45] Date of Patent: Jul. 16, 1996

[54] METHOD OF PROVIDING A PEDESTRIAN SIGNAL SYSTEM FOR VEHICLES

[76] Inventors: Harold L. Hull, 401 Canyon Way #43, Sparks, Nev. 89434; James L. Vasco, 527 Old Canyon Rd., Fremont, Calif. 94536

[21] Appl. No.: 217,647

[22] Filed: Mar. 25, 1994

Related U.S. Application Data

[63] Continuation-in-part of Ser. No. 972,781, Nov. 9, 1992, abandoned.

[51] Int. Cl.$^6$ ............................................. B60Q 1/44
[52] U.S. Cl. ............................................ 340/479; 340/475
[58] Field of Search ................................... 340/479, 475

[56] References Cited

U.S. PATENT DOCUMENTS

| | | | |
|---|---|---|---|
| 2,188,451 | 1/1940 | Baitens | 340/475 |
| 2,957,161 | 10/1960 | Daws | 340/475 |
| 3,252,136 | 6/1966 | Baitens | 340/475 |
| 3,613,076 | 10/1971 | Ballou | 340/475 |
| 3,629,821 | 9/1969 | Dobbins . | |
| 3,702,459 | 11/1972 | Bauchan . | |
| 3,784,974 | 1/1974 | Hamashige . | |
| 3,925,759 | 12/1975 | Lucas . | |
| 4,587,512 | 5/1986 | Casey . | |
| 4,591,824 | 5/1986 | Lomen | 340/475 |
| 4,594,574 | 6/1986 | Thurman . | |
| 4,837,554 | 6/1989 | Gianforcaro | 340/468 |
| 4,940,962 | 7/1990 | Sarokin | 340/479 |
| 5,025,245 | 6/1991 | Barke | 340/471 |

*Primary Examiner*—Donnie L. Crosland

[57] ABSTRACT

A method of using the existing wiring circuits of a vehicle to provide a front braking indicator signal without adding any components other than two "jumper" cables between properly identified circuits to cause the front turn signals to act in unison with the back turn signals when the braking circuit is energized.

1 Claim, 1 Drawing Sheet

5,537,091

METHOD OF PROVIDING A PEDESTRIAN SIGNAL SYSTEM FOR VEHICLES

CONTINUATION IN PART

This application is a continuation in part of application Ser. No.; 07/972,781, Filed; Nov. 09, 1992 by the same inventor and is now abandoned.

FIELD OF THE INVENTION

This invention relates in general, to vehicle brake systems and more specifically to a method of utilizing the present prior art apparatus to provide a pedestrian signal on the front of the vehicle to indicate braking as well as turning.

BACKGROUND OF THE INVENTION

In the past a number of attempts have been made to inform other motorists that your own vehicle is turning, stopping, accelerating, decelerating and most often by means of lights such as red stop lights, amber turn lights, etc. Such lighting systems are well known and well documented such as the vehicle deceleration circuit of U.S. Pat. No. 3,702,459 or the driver's communication system of U.S. Pat. No. 3,784,974. Some systems are directed at addressing the problems associated with frontal notification by lights that the vehicle is in a braking mode such as U.S. Pat. No. 4,940,962, however, this patent requires additional apparatus and switches, including the addition of extra lights on the front of the vehicle. Also, U.S. Pat. No. 5,025,245 attempts to solve this problem by adding an automatic timer and a dash mounted push button switch which is inconvenient as one hand must be taken off the wheel to energize the circuit, and involves other apparatus.

It is desirable and a need exists, to provide a method of utilizing the present prior art without the necessity and expense of adding new, complicated apparatus but utilizes only the present lights and circuitry to notify the pedestrian in front of the vehicles that the vehicle is in a braking mode.

SUMMARY OF THE INVENTION

It is a primary object of the present invention to provide a method to use the existing prior art in a new and un-obvious manner to notify the pedestrian or the occupants of the other vehicles that the host vehicle is in a braking mode.

It is another object to provide a schematic which will teach the proper points to add additional wiring to the present prior art wiring harness to accomplish the desired signals.

It is yet another important object to provide a schematic which does not interfere with the normal functions of brake lights, turn signal lights, and/or parking lights but utilizes the turn signal lights to operate in their intended manner but will also be utilized to indicate that the host vehicle is in a braking mode.

It is still another object to provide means to cause the existing prior art apparatus associated with the turn signal and braking signals, to energize the turn signal lights from the braking circuit that allows the turn signals to still indicate the direction of turn but energizes the opposite turn signal while still allowing the turn signal light indicating the direction of turn, to flash.

Still another object is to cause the front parking and turn signal lights to come on when the braking circuit is energized even when not turning.

DETAILED DESCRIPTION OF THE DRAWINGS

Figure 1:
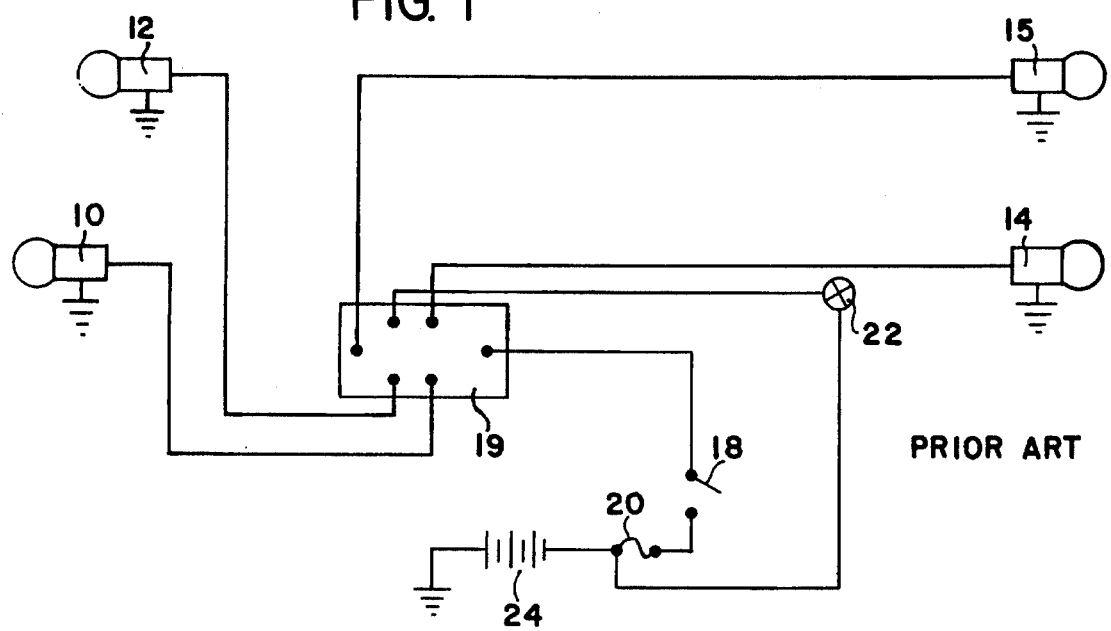
FIG. 1, is a schematic view of a typical prior art wiring harness and lighting system.

Referring now in detail to the schematic drawing of FIG. 1, 10 is a left hand parking and directional signal lamp while 12 is a right hand parking and directional signal lamp while 14 is a left hand tail, stop and directional signal lamp with 15 being the right hand tail, stop and directional signal lamp. 18 is a prior art conventional stop lamp switch with 20 being an in-line fuse, 19 is a prior art conventional directional signal switch while 22 is a flasher and 24 is a battery.

Figure 2:
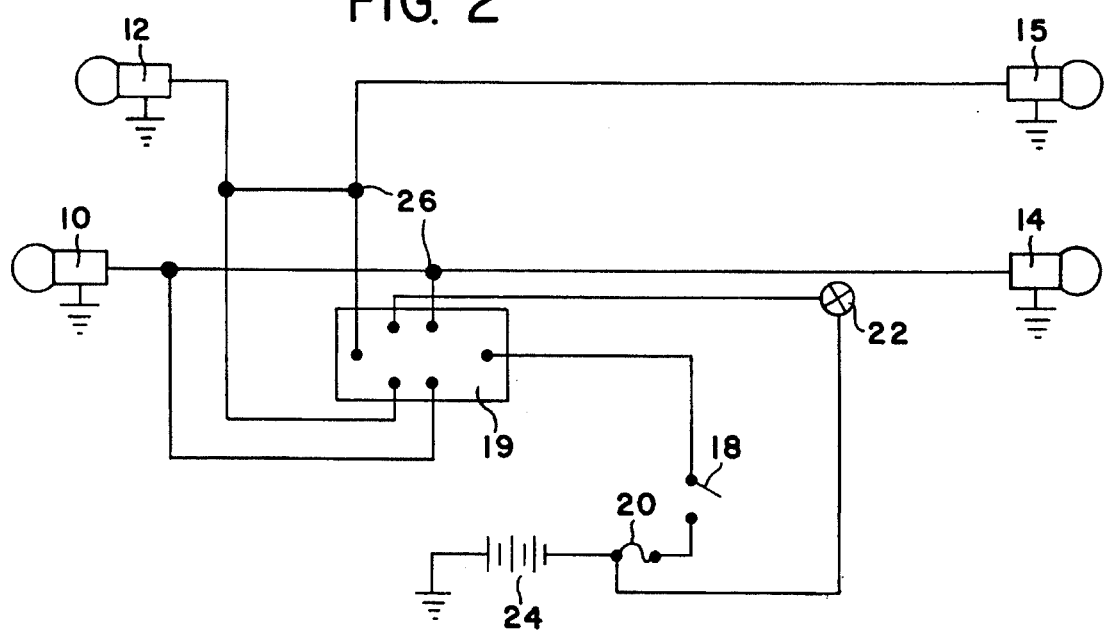
FIG. 2, is a schematic view of a prior art wiring harness and lighting system with added connections to accomplish the present method.

As shown in FIG. 2, 26 depicts the connection points at which splicing cables may be suitably attached to tie together the right rear lamp wire lead and the right front lamp wire lead and also tie together the left rear lamp wire lead and left front lamp wire lead.

Also, in some applications, such as foreign automobiles, new brake light bulbs and recepticals may be installed in the turn signal light housing and new wiring directed to the brake light switch.

It will now be seen that we have provided a method to use the existing prior art circuits which involves a braking circuit and a turn light circuit which, when connected in the manner as taught by the present method, energizes the front and back turn light signals when the braking circuit is energized and also allows the turn signal indicating the intended direction of turn of the host vehicle to flash. Now the pedestrian and vehicles-in front as well as in back are notified that the host vehicle is either braking or turning and braking.

It will also be noted that no new apparatus is needed as the method of the present invention uses only the apparatus and circuits of the host vehicle, which is generally installed at the factory and simply teaches a method of connecting the proper circuits together to accomplish these unusual results.

It will also be noted that no additional performance of the driver of the host vehicle is necessary as the method taught uses the prior art turn signal and brake signaling apparatus of the host vehicle.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A method of providing a front braking indicator signal for a vehicle having a stop lamp switch circuit, a right rear lamp brake light circuit, a left rear lamp brake light circuit, a flasher circuit, a right front lamp turn circuit, a left front lamp turn circuit, a current source, a two-position-foot-brake-operated switch having an activated position and an un-activated position, a manually operated turn switch having a neutral position and two selectively settable "left" and "right" positions, comprising the steps of:

(a) locating a wire lead from the right rear lamp brake light circuit;

(b) locating a wire lead from the right front lamp turn circuit;
(c) affixing a "jumper" cable between "a" and "b";
(d) locating a wire lead from the left rear lamp brake light circuit;
(e) locating a wire lead from the left front lamp turn circuit;
(f) affixing a "jumper" cable between "d" and "e";
(g) whereby; the activation of said foot-brake-operated switch in said activated position results in activating said right front lamp turn circuit and said left front lamp turn circuit.

* * * * *